United States Patent [19]
Hurth

[11] Patent Number: 5,388,450
[45] Date of Patent: Feb. 14, 1995

[54] GEARBOX WITH HYDROSTATIC MOTORS PARTICULARLY FOR EARTH-MOVERS

[75] Inventor: Fritz C. A. Hurth, Montagnola, Switzerland

[73] Assignee: Clark-Hurth Components S.p.A., Prov. of Trento, Italy

[21] Appl. No.: 163,578

[22] Filed: Dec. 6, 1993

Related U.S. Application Data

[63] Continuation of Ser. No. 849,881, Mar. 12, 1992, abandoned.

[30] Foreign Application Priority Data

Mar. 15, 1991 [IT] Italy .................. MI91 A 000698

[51] Int. Cl.⁶ .............................................. F16H 3/16
[52] U.S. Cl. ........................................ 74/331; 60/483; 180/307
[58] Field of Search ............... 60/435, 483, 484, 718; 74/331, 655, 664, 665 R, 665 A, 665 B, 730.1, 731.1, 733.1; 180/305, 307

[56] References Cited

U.S. PATENT DOCUMENTS

| | | | |
|---|---|---|---|
| B 584,520 | 1/1976 | Rice | 60/484 X |
| 2,943,503 | 7/1960 | Förster | 74/655 R X |
| 3,166,952 | 1/1965 | Lang | 60/483 X |
| 3,421,389 | 1/1969 | Fauchere | 75/665 R |
| 3,468,192 | 9/1969 | Nasvytis | 475/80 X |
| 3,492,891 | 2/1970 | Livezey | 475/80 X |
| 3,637,036 | 1/1972 | Swisher, Jr. et al. | 180/307 |
| 3,655,004 | 4/1972 | Hoashe | 180/307 X |
| 3,748,927 | 7/1973 | Hertzog et al. | 475/1 X |
| 3,884,095 | 5/1975 | Miyao et al. | 60/484 X |
| 3,961,546 | 6/1976 | Gilmore et al. | |
| 4,155,277 | 5/1979 | Minami et al. | |
| 4,187,739 | 2/1980 | Hamma et al. | |
| 4,269,281 | 5/1981 | Schneider et al. | |
| 4,392,393 | 7/1983 | Montgomery | 74/665 B X |
| 4,414,863 | 11/1983 | Heino | |
| 4,561,250 | 12/1985 | Aoyagi et al. | 60/483 X |
| 4,563,917 | 1/1986 | Higashi et al. | |
| 4,605,358 | 8/1986 | Burandt | 475/73 X |
| 4,658,676 | 4/1987 | Furusawa et al. | |
| 4,685,354 | 8/1987 | McCabria | 74/665 A X |
| 4,702,127 | 10/1987 | Cote | |
| 4,730,519 | 3/1988 | Nakamura et al. | |
| 4,796,485 | 1/1989 | Ebina | |
| 4,803,897 | 2/1989 | Reed | 475/6 |
| 4,807,493 | 2/1989 | Loeffler | 74/331 X |
| 4,964,313 | 10/1990 | Davis | 74/331 X |
| 4,983,149 | 1/1991 | Kita | 475/78 X |
| 5,150,628 | 9/1992 | Alfredsson | 74/331 X |
| 5,184,522 | 2/1993 | Nordkvist | 74/331 X |

FOREIGN PATENT DOCUMENTS

| | | | |
|---|---|---|---|
| 0174560 | 3/1986 | European Pat. Off. | |
| 0175192 | 3/1986 | European Pat. Off. | |
| 322202 | 6/1989 | European Pat. Off. | |
| 0460584 | 12/1991 | European Pat. Off. | |
| 0469451 | 2/1992 | European Pat. Off. | |
| 483543 | 5/1992 | European Pat. Off. | |
| 887663 | 8/1953 | Germany | 74/730.1 |
| 63-246561 | 10/1988 | Japan | 475/73 |
| 3-140657 | 6/1991 | Japan | 475/73 |
| 974532 | 11/1964 | United Kingdom | |
| 1070754 | 6/1967 | United Kingdom | |
| 2014671 | 8/1979 | United Kingdom | 475/80 |
| 2229797A | 10/1990 | United Kingdom | |

OTHER PUBLICATIONS

Mannesmann Rexroth Technical Conference Ulm, Germany "Hydraulik und Elektronik für mobile Arbeitsmaschinen" Oct. 30, 1991 p. 82, paragraph 1.4.2.

*Primary Examiner*—Dirk Wright
*Attorney, Agent, or Firm*—Dressler, Goldsmith, Shore & Milnamow, Ltd.

[57] ABSTRACT

Gearbox with hydrostatic motors particularly for earth-movers, including a first hydrostatic motor and a second hydrostatic motor, each of which is connected respectively to a first countershaft and to a second countershaft by virtue of respective first and second transmission elements. The first countershaft and the second countershaft respectively support a plurality of input gearwheels which can be selectively coupled to a respective countershaft by virtue of selection elements. The input gearwheels mesh with respective secondary gearwheels so as to define gear ratios. The secondary gearwheels are supported by a secondary shaft to which they can be selectively coupled by virtue of the selection elements. A first output gearwheel is keyed on the secondary shaft and meshes with a second output gearwheel which is keyed on an output shaft.

11 Claims, 2 Drawing Sheets

GEARBOX WITH HYDROSTATIC MOTORS PARTICULARLY FOR EARTH-MOVERS

This application is a continuation of application Ser. No. 07/849,881, filed Mar. 12, 1992, now abandoned.

BACKGROUND OF THE INVENTION

The present invention relates to a gearbox with hydrostatic motors particularly for earth-movers.

Currently earth-movers often use hydrostatic drive units, which have a total conversion ratio, or $c.r._{tot}$ defined in the following expression: $c.r._{tot}=$(max. travel speed)/(maximum working speed under traction), which is limited to a ratio of approximately nine to one, using three times the adjustment of the hydrostatic pump and the hydrostatic motor as degrees of freedom of the above expression.

In order to improve, i.e. increase, the total conversion ratio $c.r._{tot}$, gearboxes with simple clutches have been interposed between the hydrostatic motor used and the axle and, although on one hand they solve the problem of the total conversion ratio, which is provided in this case by the following expression:

$$c.r._{tot}=c.r._{pump}*c.r._{motor}*c.r._{gearbox}$$

improving it considerably, the earth-mover is forced to stop during gear shifting.

Due to this problem, some earth-movers have a range for working speeds, comprised for example between 2 and 18 km/h, and another range for travel speeds, i.e. 4.25 to 38.2 km/h.

An attempt has been made to obviate this last problem by using a transmission with two or more gears, but various studies have found that this last solution is often unacceptable due to the limited quality of gear shifting, i.e. due to power losses with consequent slippages and shocks. These further problems are caused first of all by the considerable gear intervals required, which are comprised within the range between 2.15 and 3.15, but most of all by the inertia that the hydrostatic system opposes to the change in rate of travel.

By using more gears with an equal total conversion ratio, it is possible to reduce the adjustment of the hydrostatic pump and motor; this permits either the use of smaller and less expensive components or alternatively permits the use of higher power with standard components. This has allowed the creation of power-shifts transmission with three or four gears which are extremely complicated and cost.

Hydrostatic motors have recently appeared on the market which allow adjustments down to practically zero displacement, thus allowing almost a doubling of the adjustment of the motor, which allows to practically double the total conversion ratio, raising it up to approximately 18, by using a pair of constantly engaged twin motors and by setting one to zero at high speeds or by setting to zero and disconnecting one of the two when it has reached its maximum speed and leaving the other motor to continue on its own, and finally allowing to change gear with a normal synchromesh unit when the motor is in the zero-displacement condition and all the power flows onto the other motor.

However, the greatest problem which now arises is related to a practical fact, namely that although in theory the displacement can be set to zero, in practice it is very difficult to achieve this result with sufficient precision; in other words, there is no guarantee that a motor brought to the zero-displacement condition is really idle and uses no power or has such low inertia as to allow easy gear shifting.

SUMMARY OF THE INVENTION

The aim of the present invention is to eliminate or substantially reduce the problems described above in known types of gearboxes on earth-movers by providing a gearbox with hydrostatic motors particularly for earth-movers which does not require the setting to zero of one of the two motors.

Within the scope of the above aim, an object of the present invention is to provide a gearbox which allows to use any hydrostatic motor.

Another object of the present invention is to provide a gearbox which allows easy and rapid gear shifts, eliminating the need to stop the earth-mover.

A further object of the present invention is to provide a gearbox which is relatively easy to manufacture and at competitive costs.

This aim, the objects mentioned and others which will become apparent hereinafter are achieved by a gearbox with hydrostatic motors particularly for earth-movers, according to the invention, which comprises a first hydrostatic motor and a second hydrostatic motor, characterized in that said motors have a selectively fixed and variable displacement, said first hydrostatic motor being connected to a first countershaft by virtue of first transmission means and said second hydrostatic motor being connected to a second countershaft by virtue of second transmission means, said first countershaft and said second countershaft supporting a plurality of input gearwheels which can be selectively coupled to a respective countershaft by virtue of selection means, said plurality of gearwheels meshing with respective secondary gearwheels so as to define gear ratios, said secondary gearwheels being supported by a secondary shaft to which they can be selectively coupled by virtue of said selection means, a first output gearwheel being keyed on said secondary shaft and meshing with a second output gearwheel which is keyed on an output shaft.

BRIEF DESCRIPTION OF THE DRAWINGS

Further characteristics and advantages of the invention will become apparent from the description of a preferred but not exclusive embodiment of a gearbox with hydrostatic motors particularly for earth-movers, according to the invention, illustrated by way of non-limitative example in the accompanying drawings, wherein.

DESCRIPTION OF THE PREFERRED EMBODIMENTS

Figure 1:
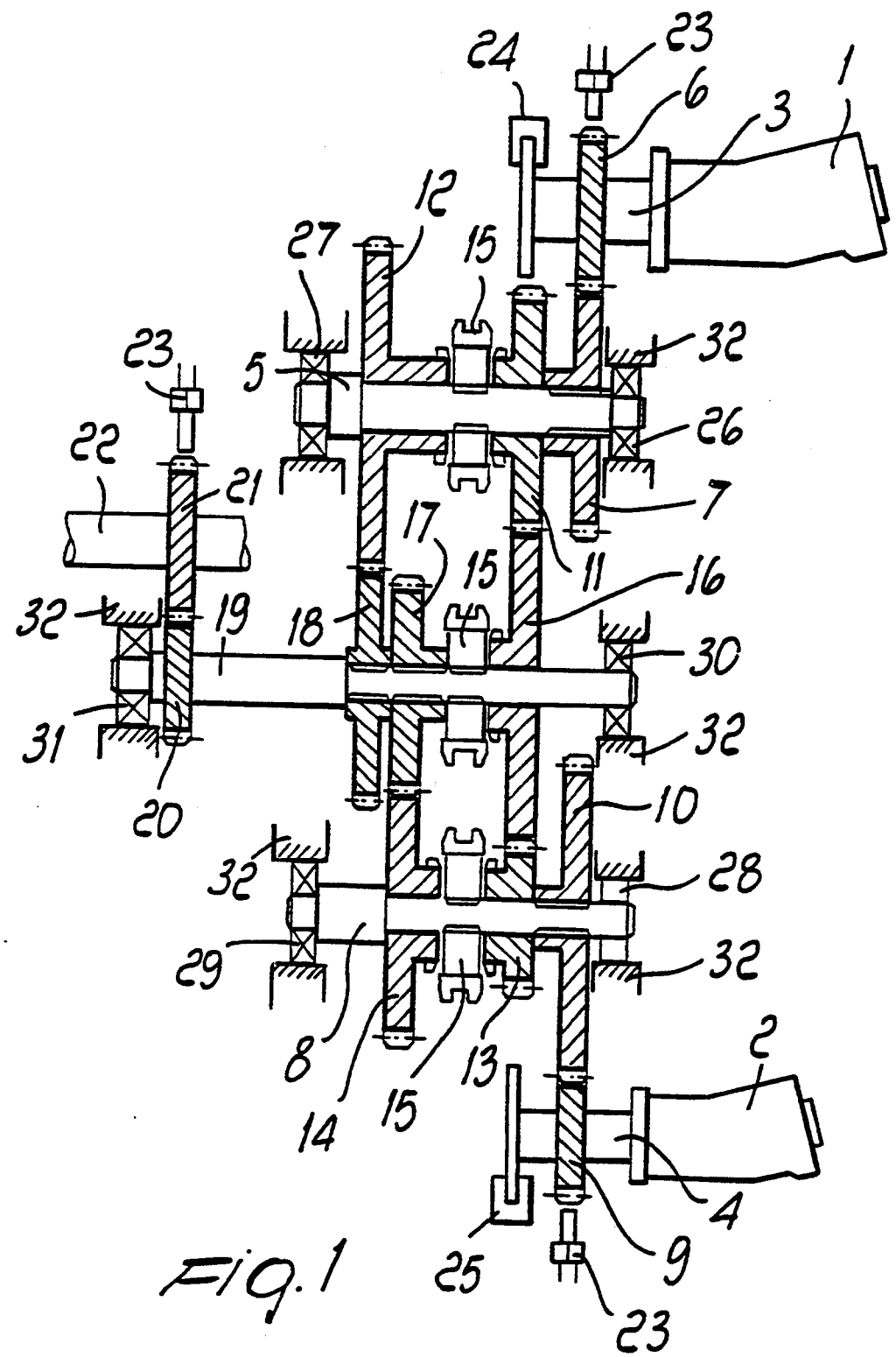
FIG. 1 is a partially sectional elevation view of a gearbox according to the invention.

With reference to FIG. 1, a gearbox with hydrostatic motors particularly for earth-movers comprises a first hydrostatic motor 1 and a second hydrostatic motor 2, each of which has a respective output shaft 3 and 4. Each of the motors 1 and 2 has an either fixed or variable displacement, which can both be used with the gearbox according to the invention.

The first hydrostatic motor 1 is connected to a first countershaft 5 by virtue of first transmission means which comprise a gearwheel 6 which is keyed on the output shaft 3 and meshes with a gearwheel 7 which is keyed on the first countershaft 5.

The second hydrostatic motor 2 is connected to a second countershaft 8 by virtue of second transmission means which comprise a gearwheel 9 which is keyed on the output shaft 4 and meshes with a gearwheel 10 which is keyed on the second countershaft 8.

The first countershaft 5 and the second countershaft 8 respectively support a plurality of input gearwheels, respectively designated by the reference numerals 11, 12, 13 and 14, which can be selectively coupled to the respective countershaft by virtue of selection means which comprise synchromesh units 15 for selectively coupling the gearwheels 11, 12, 13 and 14 to the respective countershafts 5 and 8.

The gearwheels 11, 12, 13 and 14 mesh with respective secondary gearwheels 16, 17 and 18 in order to define gear ratios. Said secondary gearwheels 16, 17 and 18 are supported by a secondary shaft 19. The secondary gearwheels 17 and 18 are keyed to the secondary shaft 19, whereas the secondary gearwheel 16 can be selectively coupled to said secondary shaft by virtue of the synchromesh unit 15.

A first output gearwheel 20 is keyed on the secondary shaft 19 and meshes with a second output gearwheel 21 which is keyed on an output shaft 22.

The present invention comprises angular velocity detection means, constituted for example by optical sensors 23, arranged at each of the gearwheels 6 and 9 which are keyed on the respective output shafts 3 and 4 of the hydrostatic motors 1 and 2 and at the second output gearwheel 21.

The gearbox furthermore comprises brake means 24 and 25 which are arranged on each output shaft 3 and 4 of the hydrostatic motors 1 and 2.

The first countershaft 5, the second countershaft 8 and the secondary shaft 19 are supported by respective bearings 26, 27, 28, 29, 30 and 31 which are fixed to a frame 32 of the gearbox in order to allow the rotation of the countershafts 5 and 8 and of the secondary shaft 19.

The described embodiment relates to a four-gear gearbox; the adaptations for gearboxes with a greater or smaller number of gear ratios are obvious.

In accordance with the invention, a hydrostatic pump (not illustrated) can be directly connected to a heat engine (not illustrated) and dimensioned to obtain a specific conversion rate. Therefore, the obtainable total conversion ratio is given by:

$$c.r._{tot} = c.r._{pump} * c.r._{gearbox}$$

In a more general case, assume that the ratio between the maximum and minimum volumes of the hydrostatic motors 1 and 2 is D ($D = V_2/V_1$) and that the two motors can be adjusted continuously from the maximum displacement to two levels of minimum displacement, and assume that the following relations are defined:

$$E = V_{1,max}/V_{1,min,I} = V_{2,max}/V_{2,min,I}$$

$$F = V_{1,max}/V_{1,min,II} = V_{2,max}/V_{2,min,II}$$

$$F > E.$$

The conversion ratio of the gearbox as a whole is therefore equal to the ratio between the maximum and minimum displacements that the motors 1 and 2 are able to provide at each turn of the output shaft 22, considering the various gear ratios by means of the clutches and the kinematic trains defined by the previously described gearwheels. Generally, therefore, the displacement provided by the motors 1 and 2 at each turn of the output shaft 22 is given by:

$$L * V_1/c.r._{mot,1} + M*(D) * V_1/c.r._{mot,2} = N * V_1 * (D),$$

where L is the mechanical ratio between the motor 1 and the output shaft 22 and M represents the mechanical ratio between the motor 2 and the output shaft 22. The ratio between the maximum and minimum volumes which can be achieved by the gearbox is thus given by $N_{max}/N_{min}$, i.e.:

$$(L_{max}*V_1 + M_{max}*(D)*V_1)/((L_{min}*(V_1/c.r._{min})) + M_{max}*(D)*(V_1/c.r._{min})) = (N_{max}*(D)*V_1)/(N_{min}*(D)*V_1) = c.r._{cambio}$$

In order to define the optimum gear ratios ($L_i$ and $M_i$), consider the following succession of adjustments from the minimum displacement to the maximum displacement; consider also that at minimum displacement the motor 1 is disconnected, and therefore $L_{min} = 0$, and that the adjustment of the motor 2 is equal to E, as previously defined. These assumptions are based on the fact that if a single hydrostatic motor is operating and if a power of the heat engine of the vehicle and a maximum rotation rate of the hydrostatic motor 2 are set, the minimum displacement is fixed. Therefore, the smaller the adjustment imparted, the smaller the size, i.e. the displacement, of said motor: the motor 1 is usually the one which has the smallest displacement and therefore the sizing of the two hydrostatic motors 1 and 2 is optimum. Therefore:

$$O + E*D*\frac{V_1}{E} = 1*D*V_1$$

$$O + E*D*V_1 = E*D*V_1$$

$$\frac{(F-1)}{F} *E^2*D*\frac{V_1}{E} + E*D*\frac{V_1}{F} = E*D*V_1$$

$$\frac{(F-1)}{F} *E^2*D*V_1 + E*D*V_1 = \left(\frac{(F-1)}{F} *E^2 + E \right)*D*V_1$$

$$\frac{(F-1)}{F} *E^2*D*\frac{V_1}{F} +$$

$$\left(\frac{F^2 - 2F + 1}{F^2} *E^3 + E^2 \right)*D*\frac{V_1}{E} =$$

$$\left(\frac{(F-1)}{F} *E^2 + E \right)*D*V_1$$

$$\frac{(F-1)}{F} *E^2*D*V_1 + \left(\frac{F^2 - 2F + 1}{F^2} *E^3 + E^2 \right)*D*V_1 =$$

$$\left(\frac{F^2 - 2F + 1}{F^2} *E^3 + \frac{2F-1}{F} *E^2 \right)*D*V_1$$

-continued $$\left(\frac{F^3 - 3F^2 + 3F - 1}{F^3} *E^4 \frac{2F-2}{F} *E^3\right)*D*\frac{V_1}{E} +$$

$$\left(\frac{F^2 - 2F + 1}{F^2} *E^3 + E^2\right)*D*\frac{V_1}{F} =$$

$$\left(\frac{F^2 - 2F + 1}{F^2} *E^3 + \frac{2F-1}{F} *E^2\right)*D*V_1$$

$$\left(\frac{F^3 - 3F^2 + 3F - 1}{F^3} *E^4 + \frac{2F-2}{F} *E^3\right)*D*V_1 +$$

$$\left(\frac{F^2 - 2F + 1}{F^2} *E^3 + E^2\right)*D*\frac{V_1}{F} =$$

$$\left(\frac{F^3 - 3F^2 + 3F - 1}{F^3} *E^4 + \frac{3F^2 - 4F + 1}{F^2} *E^3 + E^2\right)*D*V_1$$

It is therefore necessary to adjust the motors 1 and 2, i.e. the displacements $V_{1,max}$ and $V_{2,max}$, and then send them to their minimum values, i.e. make them operate with the displacements $V_{1,min}$ and $V_{2,min}$, alternately changing gear. The gear ratios are furthermore such that after adjustment the operating conditions and therefore the output torque and rate remain unchanged, so as to minimize shocks and vibrations.

By analyzing the above expressions, it can be deduced that the total adjustment obtained is independent of the ratio (D) between the hydrostatic motors, and that all the values of the gear ratios of the motor 2, or in any case of the larger-displacement motor, also depend exclusively on the adjustment of the motors, i.e. on the parameters E and F, whereas the gear ratios of the motor 1, or in any case of the smaller-displacement motor, are directly proportional to the ratio between said motors (D).

Therefore, as a general point of view, it is advantageous to use the motor 1, which has the smallest displacement of the two motors used, up to the point at which its gear ratios can be obtained mechanically and the obtained rotation rates do not exceed the limits set by the manufacturer of said motor.

Commercially, the relation of offered motors is currently equal to a maximum ratio of approximately D=1.5, beyond which it is not possible to use a smaller-displacement motor.

Figure 2:
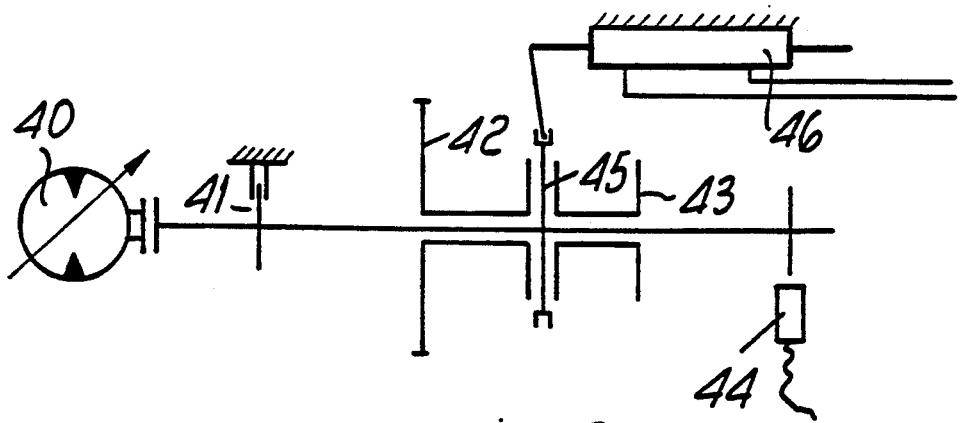
FIG. 2 is a diagram of a dual hydraulic-controlled easy-shifted clutch.

A practical example of how to obtain gear shifting with minimized shocks and vibrations is the one shown in FIG. 2 for a single countershaft, which has a hydraulic motor 40 which has, on the output shaft, a brake 41, gear ratios 42 and 43, an electronic tachometer 44 and a dual hydraulic-controlled easy-shifted clutch 45, for example of the type with radial clutch by means of balls, actuated by a hydraulic actuator 46, such as a compressor or another similar hydraulic apparatus.

When the speed of the earth-mover reduces and the conditions of maximum displacement are reached for both hydrostatic motors 1 and 2, the hydraulic actuator 46 places the chosen clutch in neutral position; the corresponding motor, which now has no load, accelerates until it synchronizes the rotation rate of the second gearwheel, while the displacements of both motors 1 and 2 are returned to minimum.

In these conditions, the electronic control of the earth-mover allows the hydraulic actuator 46 to engage the easy-shifted clutch 45, and gear shifting is thus achieved.

Instead, when the speed of the earth-mover increases and the conditions of minimum displacement are achieved in both hydrostatic motors, the hydraulic actuator 46 sets the chosen clutch to neutral, whereas the brake 41 reduces the rotation rate of the motor 40 until it is synchronized with the second gearwheel, the displacements are returned to their maximum values, the clutch 45 is engaged again and the brake 41 is released.

The described type of adjustment does not lead to imbalances in the hydrostatic system, whereas the flow of part of the power from the motors to the wheels is interrupted, and therefore it requires extremely rapid power shifting under electronic control in order to eliminate shocks and vibrations.

Consider, for example, the case of tire-fitted excavators and power loaders, which require a total conversion ratio approximately equal to 20, as exemplified by the following relation:

$$\frac{\text{maximum travel speed}}{\text{maximum working speed under traction}} = \frac{35 \div 38,18 \text{ km/h}}{1,83 \div 2 \text{ km/h}} \approx 20.$$

The conversion ratio of the pump is thus set to 1.2 in order to provide an appropriate overlap to the phases and in order to reduce the size and/or costs of the hydrostatic pump. The total adjustment of the gearbox is thus 15.91.

In order to obtain the smallest possible adjustment E and thus a smaller size and cost of the motors 1 and 2, it is possible to use the other adjustment to the maximum possible value, i.e. F=3, and the smallest possible motor 1, i.e. with D=1.5. Under these assumptions, with a four-speed gearbox such as the one shown in FIG. 1, the adjustment E is equal to 1.77 from the following equation:

$$\frac{8}{27} + E^4 + \frac{16}{9} * E^3 + E^2 = 15,91, \text{ da cui } E = 1,77$$

and the adjustments of the gearbox are as follows:

$0 + (1,77) * (1,5) * V/1,77 = (1) * (1,5) * V$ $0 + (1,77) * (1,5) * V = (1,77) * (1,5) * V$ $(2,086 * (1,5)) * \frac{V}{1,77} + (1,77) * (1,5) * \frac{V}{3} = 1,77 * (1,5) * V$ $(2,086 * (1,5)) * V + (1,77) * (1,5) * V = 3,856 * (1,5) * V$ $(2,086 * (1,5)) * \frac{V}{3} + (5,597) * (1,5) * \frac{V}{1,77} = 3,856 * (1,5) * V$ $(2,086 * (1,5)) * V + (5,597) * (1,5) * V = 7,685 * (1,5) * V$ $(10,301 * (1,5)) * \frac{V}{1,77} + (5,597) * (1,5) * \frac{V}{3} = 7,685 * (1,5) * V$ $(10,301 * (1,5)) * V + (5,597) * (1,5) * V = 15,91 * (1,5) * V$ In order to obtain the required ratios, it is possible for example to use the following numbers of teeth for the gearwheels shown in FIG. 1:

| Gearwheel no. | No. of teeth Z |
| --- | --- |
| 6 | 13 |
| 7 | 42 |
| 9 | 25 |
| 10 | 29 |
| 11 | 13 |
| 12 | 32 |
| 13 | 13 |
| 14 | 27 |
| 16 | 42 |
| 17 | 28 |
| 18 | 21. |

Figure 3:
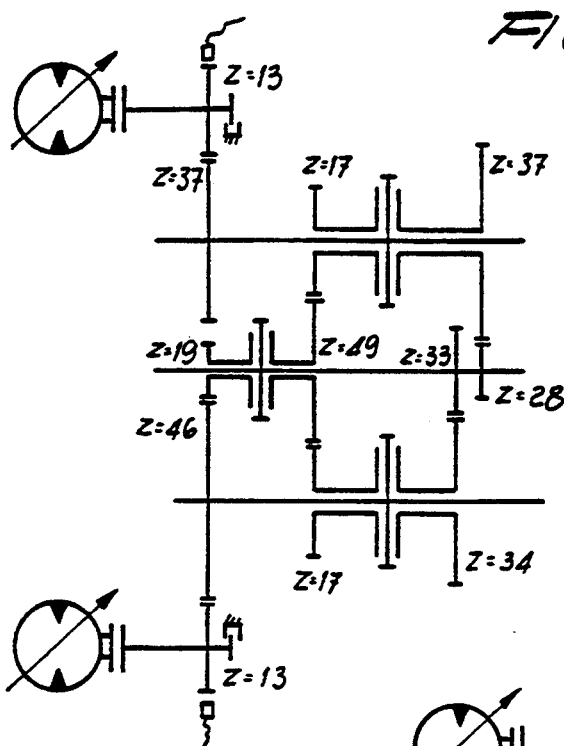
FIG. 3 is a diagram of a gearbox according to the invention, with five gears.

If the above defined parameters remain constant, for a five-gear gearbox one obtains:

$$\frac{16}{81} * E^5 + \frac{44}{27} * E^4 + \frac{7}{3} * E^3 = 15,91$$

which provides $E = 1.458$, and the adjustments of the gearbox are as follows:

$0 + (1,458) * (1,5) * V/1,458 = (1) * (1,5) * V$ $0 + (1,458) * (1,5) * V = (1,458) * (1,5) * V$ $(1,417 * (1,5)) * \frac{V}{1,458} + (1,458) * (1,5) * \frac{V}{3} = 1,458 * (1,5) * V$ $(1,417 * (1,5)) * V + (1,458) * (1,5) * V = 2,875 * (1,5) * V$ $(1,417 * (1,5)) * \frac{V}{3} + (3,503) * (1,5) * \frac{V}{1,458} = 2,875 * (1,5) * V$ $(1,417 * (1,5)) * V + (3,503) * (1,5) * V = 4,920 * (1,5) * V$ $(5,471 * (1,5)) * \frac{V}{1,458} + (3,503) * (1,5) * V = 4,920 * (1,5) * V$ $(5,471 * (1,5)) * V + (3,503) * (1,5) * V = 8,974 * (1,5) * V$ $(5,471 * (1,5)) * \frac{V}{3} + (10,426) * (1,5) * \frac{V}{1,458} = 8,974 * (1,5) *V$ $(5,471 * (1,5)) * V + (10,426) * (1,5) * V = 15,91 * (1,5) * V.$ In order to obtain the required ratios, it is possible to use the gearwheels with the teeth numbers as more clearly shown in FIG. 3.

Figure 4:
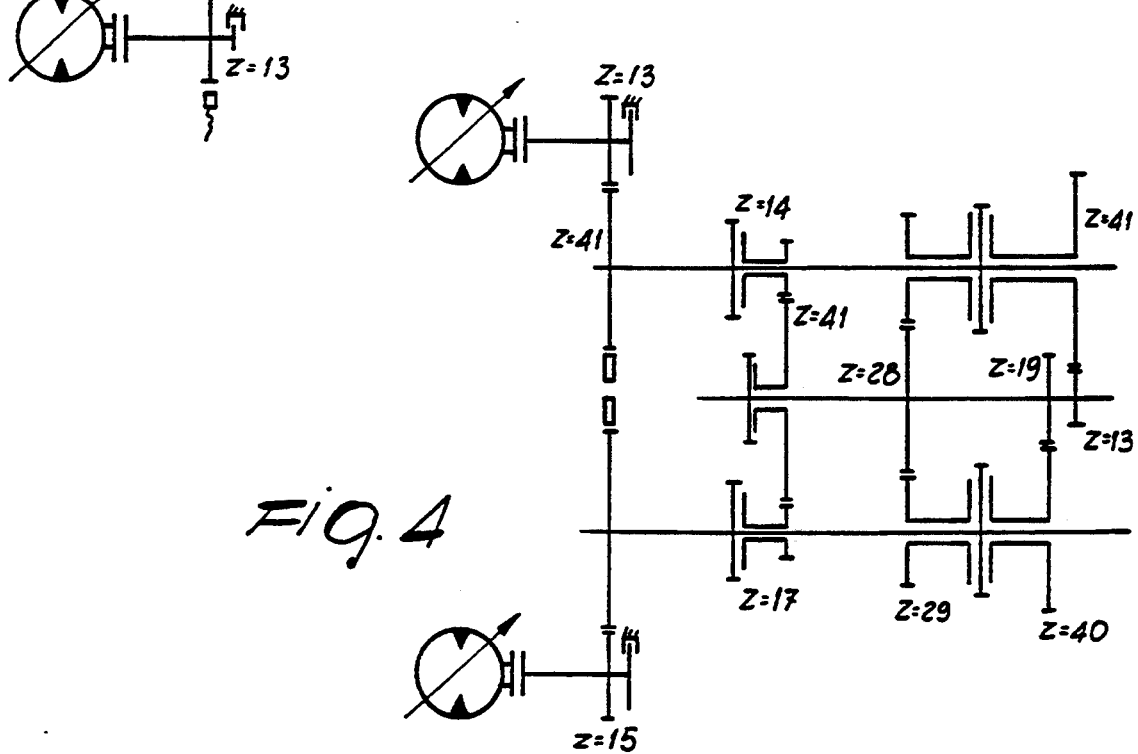
FIG. 4 is a diagram of a gearbox according to the invention, with six gears.

Finally, for a six-gear gearbox, one obtains:

$$\frac{32}{243} * E^6 + \frac{112}{81} * E^5 + \frac{10}{3} * E^4 + E^3 = 15,91,$$

which provides $E = 1.271$, and the adjustments of the gearbox are as follows:

$0 + (1,271) * (1,5) * V/1,271 = (1) * (1,5) * V$ $0 + (1,271) * (1.5) * V = (1,271) * (1,5) * V$ $(1,077 * (1,5)) * \frac{V}{1,271} + (1,271) * (1,5) * \frac{V}{3} = 1,271 * (1,5) * V$ $(1,077 * (1,5)) * V + (1,271) * (1,5) * V = 2,348 * (1,5) * V$ $(1,077 * (1,5)) * \frac{V}{3} + (2,528) * (1,5) * \frac{V}{1,271} = 2,348 * (1,5) * V$ $(1,077 * (1,5)) * V + (2,528) * (1,5) * V = 3,605 * (1,5) * V$ $(3,511 * (1,5)) * \frac{V}{1,271} + (2,528) * (1,5) * \frac{V}{3} = 3,605 * (1,5) * V$ $(3,511 * (1,5)) * V + (2,528) * (1,5) * V = 6,039 * (1,5) * V$ -continued $(3,511 * (1,5)) * \frac{V}{3} + (6,188) * (1,5) * \frac{V}{1,271} = 6,039 * (1,5) * V$ $(3,511 * (1,5)) * V + (6,188) * (1,5) * V = 9,699 * (1,5) * V$ $(9,705 * (1,5)) * \frac{V}{1,271} + (6,188) * (1,5) * \frac{V}{3} = 9,699 * (1,5) * V$ $(9,705 * (1,5)) * V + (6,188) * (1,5) * V = 15,91 * (1,5) * V$ In order to obtain the required ratios, it is possible to use the gearwheels with the teeth numbers as more clearly shown in FIG. 4.

It has been observed that the gearbox according to the invention achieves the intended aim and objects, since advantageously the need to stop to change gear is eliminated, since shocks or vibrations during power shifting are eliminated or minimized. Furthermore the need for different operating ranges for the earth-mover provided with a gearbox according to the invention is eliminated.

The gearbox according to the invention thus conceived is susceptible to numerous modifications and variations, all of which are within the scope of the inventive concept. All the details may furthermore be replaced with other technically equivalent elements.

In practice, the materials employed, as well as the dimensions, may be any according to the requirements.

I claim:

1. A three-shaft gearbox for industrial vehicles comprising:
   a first countershaft (5);
   a second countershaft (8);
   means (1, 3, 6, 7; 2, 4, 9, 10) for driving said first countershaft (5) and said second countershaft (7);
   a rotatable second countershaft (8);
   at least one first input gearwheel (11, 12) rotatably supported by said first countershaft (5);
   means (15) for rigidly connecting said at least one first input gearwheel (11, 12) with said first countershaft (5);
   at least one second input gearwheel (13, 14) rotatably supported by said second countershaft (8);
   means (15) for rigidly connecting said at least one second input gearwheel (13, 14) to said second countershaft (8);
   a secondary shaft (19);
   at least two secondary gearwheels (17, 18) supported by said secondary shaft (19); and
   means (15) for rigidly connecting said secondary gearwheels (17, 18) to said secondary shaft (19), said at least two secondary gearwheels (17, 18) being keyed to said secondary shaft (19), one of said output secondary gearwheels (17) meshing directly with said at least one first input gear (14), and another of said output secondary gearwheels (18) meshing directly with said at least one second input gear (13), wherein said means (1, 3, 6, 7; 2, 4, 9, 10) for driving said first countershaft (5) and said second countershaft (7) comprise:
   a first hydrostatic motor (1);
   a first hydrostatic motor output shaft (3);
   a first output shaft gearwheel (6) keyed on said first hydrostatic motor output shaft (3);
   a first gearwheel (7) meshing with said first output shaft gearwheel (6) and being keyed to said first countershaft (5);
   a second hydrostatic motor (2);

a second hydrostatic motor output shaft (4);
a second output shaft gearwheel (9) keyed on said second hydrostatic motor output shaft (4); and
a second gearwheel (10) meshing with said second output shaft gearwheel (9) and being keyed to said second countershaft (8).

2. A gearbox according to claim 1, wherein said at least one first input gearwheel comprises two first input gearwheels (11, 12);
wherein said at least one second input gearwheel (13, 14) comprises two second input gearwheels (13, 14); and
wherein said means (15) for rigidly connecting said second input gearwheels (13, 14) to said second countershaft (8) and said means (15) for rigidly connecting said first input gearwheels (11, 12) to said first countershaft (5) comprise a plurality of synchromesh units (15).

3. A gearbox according to claim 1, wherein said at least one first input gearwheel comprises two first input gearwheels (11, 12);
wherein said at least one second input gearwheel (13, 14) comprises two second input gearwheels (13, 14); and
wherein said secondary gearwheels (16, 17, 18) comprise at least three secondary gearwheels, one of said secondary gearwheels (16) meshing with one of said first input gearwheels (11) and with one of said second input gearwheels (13).

4. A gearbox according to claim 1, wherein said at least one first input gearwheel comprises two first input gearwheels (11, 12);
wherein said at least one second input gearwheel (13, 14) comprises two second input gearwheels (13, 14), and;
wherein said secondary gearwheels (16, 17, 18) comprise at least three secondary gearwheels, one of said secondary gearwheels (16) meshing with one of said first input gearwheels (11) and with one of said second input gearwheels (13), and
wherein said connecting means (15) comprises at least three synchromesh units including:
a first countershaft synchromesh unit (15) located on said first countershaft (5) between said two first input gearwheels (11, 12);
a second countershaft synchromesh unit (15) located on said second countershaft (8) between said two second input gearwheels (13, 14); and
a second shaft synchromesh unit (15) located on said secondary shaft (19) between said one of said output secondary gearwheels (17) meshing directly with said at least one first input gear (14) and said one of said secondary gearwheels (16) meshing with one of said first input gearwheels (11) and with one of said second input gearwheels (13).

5. A three-shaft gearbox for industrial vehicles comprising:
a first countershaft (5);
a second countershaft (8);
means (1, 3, 6, 7, 2, 4, 9, 10) for driving said first countershaft (5) and said second countershaft (7);
a rotatable second countershaft (8);
at least one first input gearwheel (11, 12) rotatably supported by said first countershaft (5);
means (15) for rigidly connecting said at least one first input gearwheel (11, 12) with said first countershaft (5);
at least one second input gearwheel (13, 14) rotatably supported by said second countershaft (8);
means (15) for rigidly connecting said at least one second input gearwheel (13, 14) to said second countershaft (8);
a secondary shaft (19);
at least two secondary gearwheels (17, 18) supported by said secondary shaft (19); and
means (15) for rigidly connecting said secondary gearwheels (17, 18) to said secondary shaft (19), wherein said at least two secondary gearwheels (17, 18) are keyed to said secondary shaft (19), and wherein one of said output secondary gearwheels (17) meshes directly with said at least one second input gear (13), and wherein said at least one first input gearwheel comprises two first input gearwheels (11, 12);
wherein said at least one second input gearwheel (13, 14) comprises two second input gearwheels (13, 14); and
wherein said secondary gearwheels (16, 17, 18) comprise at least three secondary gearwheels, one of said secondary gearwheels (16) meshing with one of said first input gearwheels (11) and with one of said second input gearwheels (13).

6. A gearbox according to claim 5, wherein said connecting means (15) comprises at least three synchromesh units including;
a first countershaft synchromesh unit (15) located on said first countershaft (5) between said two first input gearwheels (11, 12);
a second countershaft synchromesh unit (15) located on said second countershaft (8) between said two second input gearwheels (13, 14); and
a secondary shaft synchromesh unit (15) located on said secondary shaft (19) between said one of said output secondary gearwheels (17) meshing directly with said at least one first input gear (14) and said one of said secondary gearwheels (16) meshing with one of said first input gearwheels (11) and with one of said second input gearwheels (13).

7. A three-shaft gearbox for industrial vehicles comprising:
a first countershaft (5);
means (1, 3, 6, 7) for driving said first countershaft (5);
a pair of first input gearwheels (11, 12) rotatably supported by said first countershaft (5);
means (15) for selectively rigidly connecting said first input gearwheels (11, 12) with said first countershaft (5);
a second countershaft (8);
means (2, 4, 9, 10) for driving said second countershaft (8);
a pair of second input gearwheels (13, 14) rotatably supported by said second countershaft (8);
means (15) for selectively rigidly connecting said second input gearwheels (13, 14) with said second countershaft (8);
a secondary shaft (19);
at least two secondary gearwheels (16, 17, 18) supported by said secondary shaft (19) and meshing with said first and second input gearwheels; and
means (15) for rigidly connecting said secondary gearwheels (16, 17, 18) to said secondary shaft (19).

8. The gearbox of claim 7, wherein said means for driving said first countershaft comprise a first hydrostatic motor (1) and wherein said means for driving said second countershaft comprises a second hydrostatic motor (2).

9. The gearbox of claim 7, wherein said means for selectively rigidly connecting said first input gearwheels with said first countershaft comprise a first synchromesh unit supported by said first countershaft and arranged between said first input gearwheels, and wherein said means for selectively rigidly connecting said second input gearwheels with said second countershaft comprise a first synchromesh unit supported by said second countershaft and arranged between said second input gearwheels.

10. The gearbox of claim 7, wherein said secondary gearwheels comprise:

a first secondary gearwheel (16) meshing simultaneously with a first input gearwheel (11) of said first input gearwheels and a first input gearwheel (13) of said second input gearwheels;

a second secondary gearwheel (17) meshing with a second input gearwheel (14) of said second input gearwheels; and a third secondary gearwheel (18) meshing with a second input gearwheel (12) of said first input gearwheels, and wherein said means for rigidly connecting said secondary gearwheels to said secondary shaft comprise:

means for keying said second and third secondary gearwheels to said secondary shaft; and means (15) for selectively rigidly connecting said first secondary gearwheel with said secondary shaft.

11. The gearbox of claim 10, wherein said means for selectively rigidly connecting said first secondary gearwheel with said secondary shaft comprise a third synchromesh unit supported by said secondary shaft and arranged adjacent said first secondary gearwheel.

* * * * *

UNITED STATES PATENT AND TRADEMARK OFFICE
CERTIFICATE OF CORRECTION

PATENT NO.  : 5,388,450
DATED       : February 14, 1995
INVENTOR(S) : Hurth

It is certified that error appears in the above-indentified patent and that said Letters Patent is hereby corrected as shown below:

Column 5, formula beginning line 1, delete $$\left[ \left( \frac{F3 - F^2 + 3F - 1}{F^3} *E^4 \; \frac{2F - 2}{F} * E^3 \right) *D* \underline{V}_1 + \qquad \right]$$

and insert $$-- \left( \frac{F3 - F^2 + 3F - 1}{F^3} *E^4 + \frac{2F - 2}{F} * E^3 \right) *D* \underline{V}_1 + \quad -- \; .$$

Column 1, line 34, after "using a" insert —power-shift—.

Column 1, line 50, after "and" insert —expensive—.

Signed and Sealed this

Sixth Day of June, 1995

*Attest:*

BRUCE LEHMAN

*Attesting Officer*     *Commissioner of Patents and Trademarks*